US012344917B2

(12) United States Patent
Scheunis

(10) Patent No.: US 12,344,917 B2
(45) Date of Patent: Jul. 1, 2025

(54) ENERGY-EFFICIENT PYROMETALLURGICAL PROCESS FOR TREATING Li-ION BATTERIES

(71) Applicant: Umicore, Brussels (BE)

(72) Inventor: Lennart Scheunis, Olen (BE)

(73) Assignee: UMICORE, Brussels (BE)

( * ) Notice: Subject to any disclaimer, the term of this patent is extended or adjusted under 35 U.S.C. 154(b) by 0 days.

(21) Appl. No.: 18/561,016

(22) PCT Filed: May 24, 2022

(86) PCT No.: PCT/EP2022/063978
§ 371 (c)(1),
(2) Date: Nov. 15, 2023

(87) PCT Pub. No.: WO2022/248436
PCT Pub. Date: Dec. 1, 2022

(65) Prior Publication Data
US 2024/0258597 A1 Aug. 1, 2024

(30) Foreign Application Priority Data
May 26, 2021 (EP) ..................... 21176046

(51) Int. Cl.
| | | |
|---|---|---|
| C22B 23/02 | (2006.01) | |
| C22B 7/00 | (2006.01) | |
| C22B 7/04 | (2006.01) | |
| C22B 23/06 | (2006.01) | |
| H01M 4/525 | (2010.01) | |
| H01M 10/0525 | (2010.01) | |
| H01M 10/54 | (2006.01) | |

(52) U.S. Cl.
CPC .............. *C22B 23/02* (2013.01); *C22B 7/001* (2013.01); *C22B 7/004* (2013.01); *C22B 7/04* (2013.01); *C22B 23/021* (2013.01); *C22B 23/06* (2013.01); *H01M 4/525* (2013.01); *H01M 10/0525* (2013.01); *H01M 10/54* (2013.01)

(58) Field of Classification Search
CPC .......... C22B 23/02; C22B 7/011; C22B 7/04; C22B 23/021; C22B 23/06; H01M 4/525; H01M 10/0525; H01M 10/54
USPC .......................................................... 75/627
See application file for complete search history.

(56) References Cited

U.S. PATENT DOCUMENTS

| | | | | |
|---|---|---|---|---|
| 5,282,881 A | * | 2/1994 | Baldock | ..................... C22B 5/10 |
| | | | | 75/500 |
| 11,661,638 B2 | * | 5/2023 | Yagi | ........................ C22B 7/004 |
| | | | | 75/627 |
| 11,926,884 B2 | * | 3/2024 | Scheunis | ................. C22B 47/00 |
| 2005/0235775 A1 | | 10/2005 | Chen et al. | |
| 2012/0145353 A1 | * | 6/2012 | Nakayama | .............. C22B 9/006 |
| | | | | 164/493 |
| 2012/0240729 A1 | | 9/2012 | Verscheure et al. | |
| 2017/0229744 A1 | | 8/2017 | Heulens | |
| 2023/0256507 A1 | * | 8/2023 | Togashi | .............. C22B 15/0067 |

FOREIGN PATENT DOCUMENTS

| | | | | |
|---|---|---|---|---|
| AU | 509658 B2 | | 5/1980 | |
| CA | 2956874 A1 | | 2/2016 | |
| CN | 103526035 A | | 1/2014 | |
| CN | 103459624 B | * | 2/2015 | ............. C22B 1/005 |
| CN | 104674013 A | * | 6/2015 | ............. C22B 23/02 |
| CN | 110184462 A | * | 8/2019 | |
| CN | 111129632 A | | 5/2020 | |
| CN | 112176190 A | | 1/2021 | |
| CN | 112359227 A | | 2/2021 | |
| EP | 2677048 A1 | | 12/2013 | |
| EP | 3269832 B2 | | 10/2022 | |
| JP | 5360135 B2 | * | 12/2013 | ............. C22B 1/005 |
| TW | 201130184 A | | 9/2011 | |
| WO | 2011035915 A1 | | 3/2011 | |
| WO | WO-2012140951 A1 | * | 10/2012 | ............. C21B 11/10 |
| WO | 2016023778 A1 | | 2/2016 | |
| WO | 2016141875 A1 | | 9/2016 | |
| WO | 2018073145 A1 | | 4/2018 | |
| WO | 2019121086 A1 | | 6/2019 | |

OTHER PUBLICATIONS

CNIPO: Notification of First Office Action in Chinese Patent Application No. 202280037177.1, dated Aug. 30, 2024, with English Translation, 14 pages.

TIPO: First Office Action in corresponding Taiwanese Patent Application No. 111119252, dated Jul. 8, 2024, with English Translation, 6 pages.

(Continued)

*Primary Examiner* — Jun Li

(74) *Attorney, Agent, or Firm* — NK Patent Law

(57) ABSTRACT

The present disclosure concerns a 2-step smelting process, for recovering of Ni and Co from batteries and other sources.

The process comprises the steps of:
defining an oxidizing level Ox, and a battery-bearing metallurgical charge;
oxidizing smelting of the metallurgical charge by injecting an $O_2$-bearing gas into the melt to reach the defined oxidizing level Ox; and,
reducing smelting of the obtained slag using a heat source and a reducing agent.

The process is more energy-efficient than a single-step reducing smelting process and provides for a higher purity alloy and for a cleaner final slag.

12 Claims, No Drawings

(56) References Cited

OTHER PUBLICATIONS

EPO: Decision to Grant a European Patent for European Patent Application No. 2022730438.3, mailed Aug. 8, 2024, 2 pages.
EPO: Intention to Grant for European Patent Application No. 2022730438.3, mailed May 14, 2024, 7 pages.
EPO: Description of European Patent Application No. 2022730438.3, 22 pages.
ISA/EP; International Search Report and Written Opinion for International Patent Application No. PCT/EP2022/063978, mailed Sep. 21, 2022, 13 pages.

* cited by examiner

ENERGY-EFFICIENT PYROMETALLURGICAL PROCESS FOR TREATING Li-ION BATTERIES

CROSS REFERENCE TO RELATED APPLICATIONS

This application is a U.S. National Stage Application of International Patent Application No. PCT/EP2022/063978 filed on May 24, 2022, which claims priority to European Patent Application No. EP 21176046.7 filed on May 26, 2021.

The present invention relates to a process for the recovery of valuable metals, such as Ni and Co, from batteries and other sources. A Ni—Co alloy and a slag are produced.

In recent years electric vehicles have seen an unprecedented growth, among others driven by new legislation in Europe and China, designed to gradually reduce the $CO_2$ footprint of the car fleets and to limit the air pollution in cities. This growth is expected to continue during the next decades. The adoption of electric vehicles greatly depends on the performance of the batteries used to store electrical energy. To obtain the highest energy density while keeping the costs under control, Li-ion batteries are used. Many of these batteries contain cathodes based on the transition metals Ni, Mn and Co, and are therefore also known as NMC batteries. With the growth of the electric mobility market, the demand for these metals is expected to increase significantly.

The demand for Ni and Co may even surpass the worldwide production capacity. Co is particularly critical as it is today only produced as a byproduct of the Ni and Cu industry. The Ni market is significantly larger than the Co market. Most of the Ni goes to the production of stainless steel, where purity is relatively unimportant. High purity Ni and Co metals or compounds are however already in short supply. In view of the above, recovering Ni and Co from end-of-life batteries is an attractive proposal.

Many smelting processes have been proposed allowing for the recovery of metals from waste batteries. Such processes generally produce an alloy and a slag. The alloy, if sufficiently pure, may be suitable for e.g. the preparation of cathode material for Li-ion batteries, thus closing the loop. The slag, if sufficiently depleted in heavy metals, may be suitable for use in the construction industry, or for safe disposal.

It is however challenging to obtain pure alloys and highly depleted slags, while also conserving energy.

In Europe, the Classification, Labelling and Packaging (CLP) legislation EC N° 1272/2008 requires the labeling of all slags with more than 0.1% of either one of Ni and Co as a possibly hazardous material. It then requires the end users of the material to perform a risk analysis: this will impair or even prohibit the reuse of such slags in most known applications.

When smelting a metallurgical charge containing Co and/or Ni, the slag will typically contain more heavy metals than the above-mentioned limit. This is e.g. illustrated by Elwert et al. (World of Metallurgy—Erzmetall, GDMB-Medienverlag, Clausthal-Zellerfeld, Vol. 65, no. 3, 163-171, 2012), discussing three typical slags and their detailed phase compositions.

It is possible to further decrease the total of the Ni and Co content of slags to below 0.1% by increasing the level of reduction. However, these reduction reactions are endothermic and, more importantly, require a reducing agent that is most often carbon-based. The required reduction level implies that C is burnt to CO, and not to $CO_2$. This greatly limits the enthalpy available to heat and melt a metallurgical charge, mandating the use of additional heating means.

WO2018073145 teaches the addition of Co-bearing materials, such as batteries, to a Cu or Ni converter. The charge comprises essentially matte, i.e., metal sulfide. As is typical in converters, the smelting heat is generated by the oxidation of S to $SO_2$. Use is made of this reaction's enthalpy to smelt a limited fraction of batteries along with the sulfidic charge.

WO2011035915 describes a high temperature process for the treatment of waste Li-ion batteries, producing a Co-, Ni-, and Cu-containing alloy, and a slag. The energy is supplied by the oxidation of the Al and C in such batteries, which corresponds to an autogenous smelting process. To ensure such an autogenous process, WO2011035915 teaches that the percentage of waste batteries in the total charge needs to be higher than 153%−3.5 (Al+0.6 C), where Al and C are the weight % of Al and C in the batteries. The main source of the Al in the batteries comes from the casing material. Autogenous smelting according to that disclosure can only be achieved when the batteries are predominantly present in the total charge, and when the batteries contain high concentrations of Al and/or C.

Recently, a new design of battery packs with the so-called cell-to-pack technology (CTP) became more prominent in the market. Battery packs using this technology are characterized by a significantly lower Al content. The above-mentioned formula would mathematically require the addition of more than 100% of batteries in the charge. Autogenous smelting is thus not possible with such Al-poor batteries.

Other processes are available to smelt these types of batteries. For example, WO2016023778 uses an electrical plasma to supply the extra energy that is needed for the smelting of the batteries. The additional energy of course results in higher costs. A further disadvantage of this process is the higher level of impurities in the alloy. This is also observed in WO2011035915.

A 2-step smelting process for recovering metals from waste Li-ion batteries is known from EP2677048. It teaches the formation of an impure alloy in a strongly reducing first step, followed by purification in an oxidative second step. The first step is nor energy-efficient nor autogenous.

The present invention discloses an alternative 2-step smelting process that optimizes the energy requirements. Smelting conditions allow for autogenous smelting in the first step, even in cases where the Al and C content of the waste batteries are low.

This result is achieved by making a better use of the chemical energy in the waste batteries. For this, the process conditions in the first smelting step are selected to oxidize the C to $CO_2$. This contrasts with known processes, where strongly reducing conditions imply that C is oxidized to CO only. The oxidation to $CO_2$ is indeed much more exothermic, supplying the required energy to melt the complete charge, even when it contains components other than waste batteries.

Due to the oxidizing conditions of the first step, some Ni and Co will report to the slag. A reducing slag-cleaning second step is therefore needed. This second step is performed on the slag only, which is preferably kept in the liquid state, and requires only a minimal amount of energy. The total energy requirements of the combination of the 2 steps is therefore more favorable than for a single-step smelting process.

According to a first embodiment, the recovery of valuable metals from a metallurgical charge comprising slag formers, and Li-ion batteries or their derived products containing Co, Ni, metallic Al, and C, comprises the steps of:
provviding a metallurgical smelting furnace equipped with means for the submerged injection of an $O_2$-bearing gas;
defining an oxidizing level Ox characterizing oxidizing smelting conditions according to the formula:

$$Ox = pCO_2 / (pCO + pCO_2),$$

wherein $0.1 < Ox < 1$, pCO and $pCO_2$ are the partial pressures of CO and $CO_2$ in contact with the melt;
preparing the metallurgical charge comprising a weight fraction Bf of Li-ion batteries or their derived products, according to the formula:

$$1 > Bf > 0.3 / ((1 + 3.5 * Ox) * C) + 2.5 * Al),$$

wherein Ox is the oxidizing level, and Al and C are the weight fractions of respectively metallic Al and C in said batteries or their derived products;
oxidizing smelting the metallurgical charge by injecting an $O_2$-bearing gas into the melt to reach the defined oxidizing level Ox, thereby obtaining a first alloy with a major part of Ni, and a first slag containing residual Ni and Co;
liquid/liquid separation of the first alloy from the first slag; and,
reducing smelting of the first slag using a heat source and a reducing agent, maintaining a reduction potential ensuring the reduction of Ni and Co, thereby producing a second alloy, and a second slag containing less than 1% by weight of Ni, preferably less than 0.5%, and more preferably less than 0.1%.

By "slag formers" are meant: one or more of for example CaO, $Al_2O_3$ and $SiO_2$. Other slag formers, well known to the skilled person, may also be present. The slag forming compounds may be added as such, or they may be obtained in situ from easily oxidized metals present in the charge.

By "Li-ion batteries or their derived products" are meant: new or waste batteries, end-of-life batteries, production scrap, pre-processed battery materials such as after shredding or sorting. Said products should however still contain appreciable amounts of Co, Ni, metallic Al, and C.

By "major part" of an element is meant: more than 50% by weight of the elemental amount present in the metallurgical charge.

The minimal value of 0.1 for the oxidizing level Ox is determined by the need for the generation of a sufficient amount of $CO_2$ for heating up and melting a metallurgical charge, as the generation of CO only would generally not suffice. The upper limit of less than 1 corresponds to the avoidance of extremely oxidizing conditions, which would preclude the major part of the Ni to report to the alloy in the smelting step. It is hereby assumed that CO and $CO_2$ are in contact with the melt, thereby ensuring the control of the redox conditions.

The steps of defining the oxidizing Ox level with a fraction Bf of batteries need to result in conditions complying with the mentioned formulas. Based on the battery composition, it should be verified that the calculated value of Bf is physically feasible, i.e., that Bf<1. Else, a higher Ox, up to a value of less than 1, should be defined.

The above operating conditions have been found to be valid for a battery fraction Bf of more than 0.3. Below this value, the batteries will likely be unable to supply enough energy to allow an autogenous smelting of the total metallurgical charge.

Clean slags are important from an economic and ecological point of view. While the limits of 1 and 0.5% by weight of Ni are based on economics, 0.1% represents the generally accepted upper limit for re-using a slag in other useful applications.

The sequential order of the steps of defining the oxidizing Ox level, and of preparing the metallurgical charge is unimportant, if the criteria of the formulas are met. Thus, starting from a given battery fraction Bf, the minimum oxidizing level Ox can be determined. This reversed order is the object of a second embodiment.

According to a second embodiment, the recovery of valuable metals from a metallurgical charge comprising slag formers, and Li-ion batteries or their derived products containing Co, Ni, metallic Al, and C, comprises the steps of:
providing a metallurgical smelting furnace equipped with means for the submerged injection of an $O_2$-bearing gas;
preparing the metallurgical charge using a weight fraction Bf of Li-ion batteries or their derived products in the metallurgical charge;
defining an oxidizing level Ox characterizing oxidizing smelting conditions according to the formula:
$$Ox=pCO_2/(pCO+pCO_2)>(((0.3/Bf-2.5*Al)/C)-1)/3.5,$$
wherein $0.1<Ox<1$, pCO and $pCO_2$ are the partial pressures of CO and $CO_2$ in contact with the melt, and Al and C are weight the fractions of respectively metallic Al and C in said batteries or their derived products;
oxidizing smelting the metallurgical charge by injecting an $O_2$-bearing gas into the melt to reach the defined oxidizing level Ox, thereby obtaining a first alloy with a major part of Ni, and a first slag containing residual Ni and Co;
liquid/liquid separation of the first alloy from the first slag; and,
reducing smelting of the first slag using a heat source and a reducing agent, maintaining a reduction potential ensuring the reduction of Co and Ni, thereby producing a second alloy, and a second slag containing less than 1% by weight of Ni, preferably less than 0.5%, and more preferably less than 0.1%.

In this embodiment, the oxidizing level Ox is determined after having prepared the charge. It should be verified that the calculated value of Ox, which should allow for the desired oxidizing and autogenous smelting conditions, is compatible with an oxidizing level Ox<1.

It can be shown that the formulas for the determination of Bf starting from Ox, and for the determination of Ox starting from Bf, are equivalent.

Applying the formulas of the first or the second embodiment leads to an autogenous charge, which means that the step of oxidizing smelting can be performed by making use of the energy contained in the batteries or their derived products solely. No extra energy needs to be added, nor as fuel, cokes, or other carbon source, nor as reactive compound in the rest of the metallurgical charge.

In actual operations, a minor amount of energy can nevertheless be supplied for different reasons, such as, for example, compensating exceptionally high heat losses of a specific furnace. Such small amounts should preferably be limited to less than 50%, and more preferably to less than 10% of the total energy requirements of the first smelting step.

Type of furnace and exact operating temperature are not critical, but the temperature should allow to fully smelt the metallurgical charge to obtain the first alloy and the first slag. Commonly known furnaces, operating at temperatures such as 1350 to 1800° C., are suitable for smelting a charge containing Li-ion batteries or their derived products. Temperatures above 1450° C. are preferred to ensure melting of a wide variety of input materials, while temperatures below 1550° C. are preferred to limit energy consumption, as shown in examples below.

A further embodiment according to any of the preceding ones is characterized by an autogenous oxidizing smelting step, i.e., using the energy contained in the batteries or their derived products solely.

Liquid/liquid separation of alloy and slag is very common in the metallurgical industry, for example achieved by so-called "tapping" the liquid phases from the furnace.

In a further embodiment according to any of the preceding ones, the slag is maintained in the liquid state between the steps of liquid/liquid separation and the step of reducing smelting.

This ensures that the energy spent to heat up and melt the charge in the first smelting step is maximally preserved. If the slag is left to cool and solidify, additional energy will be needed to remelt it in the step of reducing smelting. This extra energy may often be tolerated, in particular when the amount of first slag is significantly lower than that of the total metallurgical charge.

In a further embodiment according to any of the preceding ones, the $O_2$-bearing gas is enriched air or pure $O_2$.

This embodiment results in less heat losses than when air is used as $O_2$-bearing gas.

In a further embodiment according to any of the preceding ones, Ox<0.98, preferably Ox<0.95.

These conditions correspond to somewhat reduced oxidizing levels. These may still be adequate to ensure autogenous smelting, while providing for better direct Ni and Co yields in the first alloy.

In a further embodiment according to any of the preceding ones, said slag formers comprise, by weight, up to 50% CaO, up to 55% $Al_2O_3$, and up to 65% $SiO_2$.

Using these guidelines, the skilled person will easily obtain a slag having a sufficiently low viscosity at the operating temperature to allow for decantation and separation of the phases. The slag formers may be added as such, or may be generated in situ by the oxidation of metals present in the charge, such as Si or Al.

In a further embodiment according to any of the preceding ones, the process comprises a step of transferring the separated first slag to a second furnace suitable for performing the step of reducing smelting, thereby obtaining a second Ni and Co-bearing alloy, and a depleted second slag.

The smelting steps can thus be performed batch-wise with the intermediate tapping of the Ni—Co alloy, or they can be performed in two different furnaces.

In a further embodiment according to the preceding one, said second furnace is an electric furnace.

Electric furnaces are indeed suitable when high-temperature, strongly reductive conditions are needed.

In a further embodiment according to any of the preceding ones, the process comprises a step of liquid/liquid separation of the second alloy from the second slag.

This second alloy may be further treated by hydrometallurgy, with the metals separated and purified. This implies a leaching step, which is preferably performed after atomizing the alloy.

In a further embodiment according to the preceding one, the process comprises a step of recirculating the separated second alloy to the step of oxidizing smelting the metallurgical charge, preferably in liquid state.

This embodiment results in an excellent Ni and Co global yield in the first alloy, even when the direct yields to the first alloy are low.

In a further embodiment according to any of the preceding ones, the process comprises the steps of:
  atomizing the first alloy; and,
  dissolving the atomized alloy in acidic conditions, thereby obtaining a metal-bearing solution suitable for further hydrometallurgical refining.

The oxidizing level of the first step is defined by the parameter Ox, i.e., the $pCO_2$ to $(pCO+pCO_2)$ ratio. In practice, this level will result in a major part of the Ni reporting to the first alloy. The residual Ni will report to the first slag, amounting to a concentration of more than 2% by weight, preferably of more than 5%. This residual slagged Ni, together with any slagged Co, will be recovered in the second alloy.

According to the above embodiments, the oxidizing operating conditions in the first step result in the production of a large quantity of relatively pure Ni and Co first alloy, containing little or no other metals such as Si, Fe, or Mn. These conditions allow for the full oxidation of at least part of the C to $CO_2$, producing the necessary energy to melt the charge.

The reducing operating conditions in the second step ensure the full recovery of Ni and Co in a small quantity of a second alloy. This alloy can be further processed, or recycled to the first step, ensuring an excellent global yield for Ni and Co. This second step generates a clean second slag, with less than 1% by weight of Ni. It requires no significant energy beyond the compensation of heat losses, in particular if the first slag is kept liquid.

Too strong reducing conditions in the second step will have no critical detrimental effect, but might result in an alloy containing an undesirably high amount of Si and Mn. The Si may generate difficulties during the downstream processing of the alloy as it is linked with filtration issues in the hydrometallurgical treatment of the alloy. The Mn reduction requires additional energy in the second step and is therefore undesirable beyond the production of a clean slag.

The skilled person will easily be able to control the degree of reduction by dosing reducing agents such as coal or natural gas, guided by the observed behavior of Co, Ni and Mn.

The invention is illustrated in the following Examples.

EXAMPLE 1

A metallurgical charge according to Table 1 is prepared with 500 kg batteries, 80 kg limestone and 20 kg silica. Use is made of a cylindrical furnace with a diameter of 1 m, lined with 200 mm magnesia-chrome bricks.

The charge is continuously added to the furnace at a rate of 500 kg batteries/h, while a bath temperature of 1450° C. is maintained without the need for additional cokes, natural gas or electrical energy. The heat is supplied by the oxidation of Al and C in the batteries, using submerged $O_2$ injection at a rate of 77 $Nm^3$/h. These conditions correspond to a $CO_2$ to $(CO+CO_2)$ ratio of 0.30.

After 1 h, the slag (1.1) is tapped from the furnace, while the alloy (1.1) is allowed to cool down. This slag, amounting to 188 kg, is fed to a second furnace, while it is still liquid. For this second step, an electric furnace is used.

TABLE 1

Material balance of the first smelting step

| Input | Mass (kg) | $Al_2O_3$ (Al) (%) | $SiO_2$ (%) | CaO (%) | Mn (%) | Co (%) | Cu (%) | Ni (%) | Fe (%) | Li (%) | C (%) |
|---|---|---|---|---|---|---|---|---|---|---|---|
| Batteries | 500 | (5) | — | — | 7 | 7 | 12.3 | 26.3 | 3.5 | 2 | 15 |
| Limestone | 80 | — | 4.8 | 53.3 | — | — | — | — | — | — | 11.4 |
| Silica | 20 | — | 100 | — | — | — | — | — | — | — | — |

| Output | Mass (kg) | | | | | | | | | | |
|---|---|---|---|---|---|---|---|---|---|---|---|
| Slag 1.1 | 188 | 21 | 12.5 | 24 | 15 | 1.1 | 0.8 | 0.5 | 4.5 | 5.2 | — |
| Alloy 1.1 | 233 | — | — | — | <0.1 | 14 | 26 | 56 | 4 | — | — |

| Yield | Mass (%) | | | | | | | | | | |
|---|---|---|---|---|---|---|---|---|---|---|---|
| Slag 1.1 | 45 | 100 | 100 | 100 | 100 | 6.0 | 2.4 | 0.7 | 47.6 | 100 | — |
| Alloy 1.1 | 55 | — | 0 | 0 | 0 | 94.0 | 97.6 | 99.3 | 52.4 | 0 | — |

The electric furnace is operated at a temperature of 1500° C. and 3.5 kg of cokes is added as reducing agent to the slag. 30 kWh of net electrical power is supplied to the electrical furnace in order to maintain the temperature of the bath.

After 1 h of reduction, and after decantation, slag (1.2) and alloy (1.2) are tapped from the furnace and allowed to cool down. A detailed material balance is provided in Table 2.

TABLE 2

Material balance of the second smelting step

| Input | Mass (kg) | $Al_2O_3$ (Al) (%) | $SiO_2$ (Si) (%) | CaO (%) | Mn (%) | Co (%) | Cu (%) | Ni (%) | Fe (%) | Li (%) |
|---|---|---|---|---|---|---|---|---|---|---|
| Slag 1.1 | 188 | 21 | 12.5 | 24 | 15 | 1.1 | 0.8 | 0.5 | 4.5 | 5.2 |

| Output | Mass (kg) | | | | | | | | | |
|---|---|---|---|---|---|---|---|---|---|---|
| Slag 1.2 | 172 | 22 | 13.7 | 26 | 14.9 | <0.1 | <0.1 | <0.1 | 0.8 | 5.4 |
| Alloy 1.2 | 12 | — | (0.2) | — | 5.7 | 18 | 12.5 | 6 | 58 | 0 |

| Yield | Mass (%) | | | | | | | | | |
|---|---|---|---|---|---|---|---|---|---|---|
| Slag 1.2 | 93.5 | 100 | 99.8 | 100 | 97.4 | 0 | 0 | 0 | 16.5 | 100 |
| Alloy 1.2 | 6.5 | — | (0.2) | 0 | 2.6 | 100 | 100 | 100 | 83.5 | 0 |

EXAMPLE 2 (COMPARATIVE)

A metallurgical charge according to Table 3 is prepared with 500 kg batteries, 80 kg limestone and 20 kg silica. Use is made of a cylindrical furnace with a diameter of 1 m, lined with 200 mm magnesia-chrome bricks.

The charge is continuously added to the furnace at a rate of 500 kg batteries/h, while a bath temperature of 1450° C. is maintained without the need for additional cokes, natural gas or electrical energy. 42 $Nm^3$/hour of $O_2$ is injected to reach the desired degree of reduction for high metal yields. The applied conditions correspond to a $CO_2$ to $(CO+CO_2)$ ratio of 0.0, i.e., there is essentially only CO and no $CO_2$. 220 kWh of net electrical power is needed to maintain the desired temperature.

After 1 h of reduction, and after decantation, slag (2) and alloy (2) are tapped from the furnace and allowed to cool down. A detailed material balance is provided in Table 3.

TABLE 3

Material balance of the single step smelting

| Input | Mass (kg) | $Al_2O_3$ (Al) (%) | $SiO_2$ (Si) (%) | CaO (%) | Mn (%) | Co (%) | Cu (%) | Ni (%) | Fe (%) | Li (%) | C (%) |
|---|---|---|---|---|---|---|---|---|---|---|---|
| Batteries | 500 | (5) | — | — | 7 | 7 | 12.3 | 26.3 | 3.5 | 2 | 15 |
| Limestone | 80 | — | 4.8 | 53.3 | — | — | — | — | — | — | 11.4 |
| Silica | 20 | — | 100 | — | — | — | — | — | — | — | — |
| Output | Mass (kg) | | | | | | | | | | |
| Slag 2 | 150 | 25.2 | 15.8 | 30.5 | 6.5 | <0.1 | <0.1 | <0.1 | <0.1 | 5.9 | — |
| Alloy 2 | 262 | — | (0.3) | — | 6.6 | 13.3 | 23 | 50 | 6.6 | — | 1.2 |
| Yield | Mass (%) | | | | | | | | | | |
| Slag 2 | 36 | 100 | 93.3 | 100 | 36.1 | 0.4 | 0.2 | 0.1 | 0 | 100 | — |
| Alloy 2 | 64 | 0 | 6.7 | 0 | 63.9 | 99.6 | 99.8 | 99.9 | 100 | 0 | — |

Comparison of Examples 1 and 2

The first alloy (1.1) produced in Example 1 contains less impurities than the alloy (2) from comparative Example 2. This is especially the case for C and Mn, where the concentration in Example 1 drops below the detection limit of 0.1%, compared to 1.2% for C and 6.6% for Mn. This is also the case for Fe, where the concentration in the first alloy (1.1) is 4%, compared to 6.6% in the alloy (2) according to the comparative Example. The high purity obtained according to Example 1 will make any hydrometallurgical follow-up treatment of the alloy easier and cheaper.

In addition, the required electrical energy over both steps also differs between Example 1 and 2. In Example 1, only 30 kWh of energy is needed to run the reduction process, compared to 220 kWh in comparative Example 2. The two-step smelting process of Example 1 only required 14% of the electrical energy according to comparative Example 2.

It should be noted that the specific electrical energy needed in the reducing step will be even lower when using a larger, industrial scale furnace. As the volume to area ratio of the furnace will increase, heath losses will decrease, providing an even larger advantage.

EXAMPLE 3

A metallurgical charge according to Table 4 is prepared with 500 kg batteries, 80 kg limestone and 20 kg silica, as well as 500 kg of slag and 100 kg of alloy coming e.g. from other battery recycling operations. Use is made of a cylindrical furnace with a diameter of 1 m, lined with 200 mm magnesia-chrome bricks.

TABLE 4

Material balance of the first smelting step

| Input | Mass (kg) | $Al_2O_3$ (Al) (%) | $SiO_2$ (Si) (%) | CaO (%) | Mn (%) | Co (%) | Cu (%) | Ni (%) | Fe (%) | Li (%) | C (%) |
|---|---|---|---|---|---|---|---|---|---|---|---|
| Batteries | 500 | (5) | — | — | 7 | 7 | 12.3 | 26.3 | 3.5 | 2 | 15 |
| Limestone | 80 | — | 4.8 | 53.3 | — | — | — | — | — | — | 11.4 |
| Silica | 20 | — | 100 | — | — | — | — | — | — | — | — |
| Slag | 500 | 46 | 21 | 24 | 11.5 | 3 | | 2 | | 3.7 | |
| Alloy | 100 | | | | | 7 | 23 | 9 | 60 | | |

TABLE 4-continued

Material balance of the first smelting step

| Output | Mass (kg) | | | | | | | | | | |
|---|---|---|---|---|---|---|---|---|---|---|---|
| Slag 3.1 | 922 | 26.3 | 13.8 | 18 | 10.2 | 6.4 | 2 | 4.5 | 1.7 | 3.2 | — |
| Alloy 3.1 | 226 | — | — | — | <0.1 | 6.5 | 22.8 | 70.7 | 0.2 | — | — |
| Yield | Mass (%) | | | | | | | | | | |
| Slag 3.1 | 80 | 100 | 100 | 100 | 100 | 80.1 | 26.4 | 20.6 | 97.2 | 100 | — |
| Alloy 3.1 | 20 | 0 | 0 | 0 | 0 | 19.9 | 73.6 | 79.4 | 2.8 | 0 | — |

The charge is continuously added to the furnace at a rate of 500 kg batteries/h, while a bath temperature of 1450° C. is maintained without the need for additional cokes, natural gas or electrical energy. The heat is supplied by the oxidation of Al and C from the batteries using the submerged of 140 Nm$^3$/h of $O_2$. These conditions correspond to a $CO_2$ to $(CO+CO_2)$ ratio of 0.85.

After one hour, the formed alloy (3.1) is tapped from the furnace and is allowed to cool down. A total of 922 kg of the slag (3.1) is tapped and fed into a second furnace, while it is still liquid. For this step an electric furnace is used.

The electric furnace is operated at a temperature of 1500° C., and 45 kg of cokes is added to the slag. After 1 hour of reduction, and after decantation, the alloy (3.2) and the slag (3.2) are tapped from the furnace and allowed to cool down. A detailed material balance is provided in Table 5. 190 kWh of net electrical power is supplied to the electric furnace in order to maintain the temperature of the bath.

TABLE 5

Material balance of the second smelting step

| Input | Mass (kg) | $Al_2O_3$ (Al) (%) | $SiO_2$ (Si) (%) | CaO (%) | Mn (%) | Co (%) | Cu (%) | Ni (%) | Fe (%) | Li (%) |
|---|---|---|---|---|---|---|---|---|---|---|
| Slag 3.1 | 922 | 26.3 | 13.8 | 18 | 10.2 | 6.4 | 4.5 | 1.7 | 1.7 | 3.2 |
| Output | Mass (kg) | | | | | | | | | |
| Slag 3.2 | 707 | 31.5 | 18 | 23.3 | 10.8 | <0.1 | <0.1 | <0.1 | <0.1 | 3.7 |
| Alloy 3.2 | 150 | — | (0.4) | — | 10.2 | 39 | 12 | 27.8 | 11.2 | 0 |
| Yield | Mass (%) | | | | | | | | | |
| Slag 3.2 | 82 | 100 | 99 | 100 | 83 | 0 | 0 | 0 | 0 | 100 |
| Alloy 3.2 | 18 | 0 | 1 | 0 | 17 | 100 | 100 | 100 | 100 | 0 |

This Example illustrates that the process allows for autogenous operation, even when a significant amount of the charge comprises other components than batteries. A higher degree of oxidation is however needed: 0.85 in Example 3, compared to 0.30 In Example 1. This results in a first alloy (3.1) that is rich in Ni and depleted in Fe. These specifications are advantageous. However, the Ni and Co yields of the first smelting step are lower. This lower yield may be fully compensated by recycling alloy from the second smelting step to the first smelting step.

EXAMPLE 4

The Li-ion batteries with a composition shown in Table 6 are smelted according to the invention in a cylindrical furnace with a diameter of 1 meter, lined with 200 mm magnesia-chrome bricks.

A metallurgical charge is prepared comprising 180 kg limestone and 150 kg silica as fluxing agents, and 500 kg Li-ion batteries.

The mixture is continuously added at a rate of 500 kg batteries/h to the furnace and a bath temperature of 1350° C. is maintained without the need for cokes, natural gas or electrical energy. The energy is supplied by the oxidation of Al and C from the batteries using submerged $O_2$ injection. 91 Nm$^3$/hour of $O_2$ is injected for the charge shown in table 6. These conditions correspond to a $CO_2/(CO+CO_2)$ ratio of 0.45.

After 1 h, the phases are tapped from the furnace. The alloy (4.1) is allowed to cool down. The slag (4.1), amounting to 400 kg, is fed to a second furnace, while it is still liquid. For this second step, an electric furnace is used.

TABLE 6

Material balance of the first smelting step

| Input | Mass (kg) | Al$_2$O$_3$ (Al) (%) | SiO$_2$ (%) | CaO (%) | Mn (%) | Co (%) | Cu (%) | Ni (%) | Fe (%) | Li (%) | C (%) |
|---|---|---|---|---|---|---|---|---|---|---|---|
| Batteries | 500 | (5) | — | — | 7.2 | 7.8 | 12.5 | 7.2 | 1 | 3 | 15 |
| Limestone | 180 | — | 4.8 | 53.3 | — | — | — | — | — | — | 11.4 |
| SiO$_2$ | 150 | — | 100 | — | — | — | — | — | — | — | — |
| Output | Mass (kg) | | | | | | | | | | |
| Slag 4.1 | 400 | 8.4 | 39.5 | 25 | 8.9 | 1.5 | 0.6 | 0.5 | 1 | 3.7 | — |
| Alloy 4.1 | 130 | — | — | — | <0.1 | 25 | 46 | 27 | 1 | — | — |
| Yield | Mass (%) | | | | | | | | | | |
| Slag 4.1 | 75 | 100 | 100 | 100 | 100 | 6.0 | 2.4 | 0.7 | 47.6 | 100 | — |
| Alloy 4.1 | 25 | 0 | 0 | 0 | 0 | 94.0 | 97.6 | 99.3 | 52.4 | 0 | — |

After the first step, the slag is separated and transported to an electric furnace where a temperature of 1500° C. is applied and 10 kg of cokes are added per hour together with 400 kg of slag. After 1 h of reduction and decantation, the alloy and the slag are tapped from the furnace and allowed to cool down. A detailed material balance is provided in Table 7.

TABLE 7

Material balance of the second smelting step

| Input | Mass (kg) | Al$_2$O$_3$ (%) | SiO$_2$ (Si) (%) | CaO (%) | Mn (%) | Co (%) | Cu (%) | Ni (%) | Fe (%) | Li (%) |
|---|---|---|---|---|---|---|---|---|---|---|
| Slag 4.1 | 400 | 8.4 | 39.5 | 25 | 8.9 | 1.5 | 0.6 | 0.5 | 1 | 3.7 |
| Output | Mass (kg) | | | | | | | | | |
| Slag 4.2 | 375 | 6.7 | 43 | 27 | 9.5 | <0.1 | <0.1 | <0.1 | 0.8 | 3.7 |
| Alloy 4.2 | 16 | — | (0.2) | — | 5.8 | 44 | 14 | 13 | 23 | BDL |
| Yield | Mass (%) | | | | | | | | | |
| Slag 4.2 | 96 | 100 | 99.9 | 100 | 97.5 | 0 | 0 | 0 | 45 | 100 |
| Alloy 4.2 | 4 | 0 | 0.1 | 0 | 2.5 | 100 | 100 | 100 | 55 | 0 |

EXAMPLE 5

A metallurgical charge according to Table 8 is prepared with 500 kg Li-ion batteries, 100 kg limestone and 40 kg silica. Use is made of a cylindrical furnace with a diameter of 1 m, lined with 200 mm magnesia-chrome bricks.

The charge is continuously added to the furnace at a rate of 500 kg batteries/h, while a bath temperature of 1550° C. is maintained without the need for additional cokes, natural gas or electrical energy. The heat is supplied by the oxidation of Al and C in the batteries, using submerged O$_2$ injection at a rate of 77 Nm$^3$/h. These conditions correspond to a CO$_2$ to (CO+CO$_2$) ratio of 0.30.

After 1 h, the slag (5.1) is tapped from the furnace, while the alloy (5.1) is allowed to cool down. This slag, amounting to 188 kg, is fed to a second furnace, while it is still liquid. For this second step, an electric furnace is used.

TABLE 8

Material balance of the first smelting step

| Input | Mass (kg) | Al$_2$O$_3$ (Al) (%) | SiO$_2$ (%) | CaO (%) | Mn (%) | Co (%) | Cu (%) | Ni (%) | Fe (%) | Li (%) | C (%) |
|---|---|---|---|---|---|---|---|---|---|---|---|
| Batteries | 500 | (5) | — | — | 2.4 | 2.6 | 5 | 20.8 | 1 | 2 | 15 |
| Limestone | 100 | — | 4.8 | 53.3 | — | — | — | — | — | — | 11.4 |
| Silica | 40 | — | 100 | — | — | — | — | — | — | — | — |

TABLE 8-continued

Material balance of the first smelting step

| Output | Mass (kg) | | | | | | | | | | |
|---|---|---|---|---|---|---|---|---|---|---|---|
| Slag 1.1 | 188 | 21 | 22.4 | 30 | 6.2 | 0.6 | 0.3 | 0.5 | 1 | 5.3 | — |
| Alloy 1.1 | 143 | — | — | — | <0.1 | 8 | 16 | 72 | 2 | — | — |
| Yield | Mass (%) | | | | | | | | | | |
| Slag 1.1 | 57 | 100 | 100 | 100 | 100 | 9.0 | 2.4 | 0.9 | 39.7 | 100 | — |
| Alloy 1.1 | 43 | — | 0 | 0 | 0 | 91.0 | 97.6 | 99.1 | 60.3 | 0 | — |

The electric furnace is operated at a temperature of 1500° C. and 3.5 kg of cokes is added as reducing agent to the slag.

After 1 h of reduction, and after decantation, slag (5.2) and alloy (5.2) are tapped from the furnace and allowed to cool down. A detailed material balance is provided in Table 9.

TABLE 9

Material balance of the second smelting step

| Input | Mass (kg) | $Al_2O_3$ (Al) (%) | $SiO_2$ (Si) (%) | CaO (%) | Mn (%) | Co (%) | Cu (%) | Ni (%) | Fe (%) | Li (%) |
|---|---|---|---|---|---|---|---|---|---|---|
| Slag 5.1 | 188 | 21 | 22.4 | 30 | 6.2 | 0.6 | 0.3 | 0.5 | 1 | 5.3 |
| Output | Mass (kg) | | | | | | | | | |
| Slag 5.2 | 175 | 20 | 25 | 33 | 6.5 | <0.1 | <0.1 | <0.1 | <0.1 | 5.4 |
| Alloy 5.2 | 5 | — | (0.3) | — | 9.4 | 22 | 11 | 20 | 37 | 0 |
| Yield | Mass (%) | | | | | | | | | |
| Slag 5.2 | 97.2 | 100 | 99.9 | 100 | 96 | 0 | 0 | 0 | 0 | 100 |
| Alloy 5.2 | 2.8 | — | (0.1) | 0 | 4 | 100 | 100 | 100 | 100 | 0 |

CONCLUSION

Example 4 and 5 show an autogenous process having different temperatures of the first smelting step.

Comparing the used battery fraction of the feed, with the minimum required battery fraction (Bf) for autogenous smelting, using the battery composition and oxidizing level, $Ox = pCO_2/(pCO+pCO_2)$ $$1 > Bf > 0.3/((1 + 3.5*Ox)*C) + 2.5*Al)$$

Example 4 has a battery fraction of 60%, while 59% is required for autogenous smelting. Example 4 thus shows the minimum required battery fraction for autogenous smelting for the given battery composition and chosen oxidizing level. The process is operated at 1350° C., sufficient to keep both the slag and alloy liquid.

Example 5 has a battery fraction of 78%, while a 69% is required for autogenous smelting. Example 5 thus uses a higher battery fraction than the minimum required for autogenous smelting and the process is operated at 1550° C.

The invention claimed is:

1. Process for the recovery of valuable metals from a metallurgical charge comprising slag formers, and Li-ion batteries or their derived products containing Co, Ni, metallic Al, and C, wherein the slag formers comprise one or more of CaO, $Al_2O_3$, and $SiO_2$, comprising the steps of:

providing a metallurgical smelting furnace equipped with means for the submerged injection of an $O_2$-bearing gas;

defining an oxidizing level Ox characterizing oxidizing smelting conditions according to the formula:

$$Ox = pCO_2 / (pCO + pCO_2),$$

wherein 0.1<Ox<1, pCO and $pCO_2$ are the partial pressures of CO and $CO_2$ in contact with the melt;

preparing the metallurgical charge comprising a weight fraction Bf of Li-ion batteries or their derived products, according to the formula:

$$1 > Bf > 0.3/((1 + 3.5*Ox)*C) + 2.5*Al),$$

wherein Ox is the oxidizing level, and Al and C are the weight fractions of respectively metallic Al and C in said batteries or their derived products;

oxidizing smelting the metallurgical charge by injecting an $O_2$-bearing gas into the melt to reach the defined oxidizing level Ox, thereby obtaining a first alloy with a major part of Ni, and a first slag containing residual Ni and Co;

liquid/liquid separation of the first alloy from the first slag; and reducing smelting of the first slag using a heat source and a reducing agent, maintaining a reduction potential ensuring the reduction of Co and Ni, thereby producing a second alloy, and a second slag containing less than 1% by weight of Ni.

2. Process for the recovery of valuable metals from a metallurgical charge comprising slag formers, wherein the slag formers comprise one or more of CaO, $Al_2O_3$ and $SiO_2$, and Li-ion batteries or their derived products containing Co, Ni, metallic Al, and C, comprising the steps of:

providing a metallurgical smelting furnace equipped with means for the submerged injection of an $O_2$-bearing gas;

preparing the metallurgical charge using a weight fraction Bf of Li-ion batteries or their derived products in the metallurgical charge;

defining an oxidizing level Ox characterizing oxidizing smelting conditions according to the formula:

$$Ox = pCO_2/(pCO + pCO_2) > (((0.3/Bf - 2.5*Al)/C) - 1)/3.5,$$

wherein 0.1<Ox<1, pCO and $pCO_2$ are the partial pressures of CO and $CO_2$ in contact with the melt, and Al and C are the weight fractions of respectively metallic Al and C in said batteries or their derived products;

oxidizing smelting the metallurgical charge by injecting an $O_2$-bearing gas into the melt to reach the defined oxidizing level Ox, thereby obtaining a first alloy with a major part of Ni, and a first slag containing residual Ni and Co;

liquid/liquid separation of the first alloy from the first slag; and, reducing smelting of the first slag using a heat source and a reducing agent, maintaining a reduction potential ensuring the reduction of Co and Ni, thereby producing a second alloy, and a second slag containing less than 1% by weight of Ni.

3. Process according to claim 1, wherein the step of oxidizing smelting is autogenous.

4. Process according to claim 1, wherein the first slag is maintained in the liquid state between the steps of liquid/liquid separation and the step of reducing smelting.

5. Process according to claim 1, wherein the $O_2$-bearing gas is enriched air or pure $O_2$.

6. Process according to claim 1, wherein Ox<0.98.

7. Process according to claim 1, wherein said slag formers comprise, by weight, up to 50% CaO, up to 55% $Al_2O_3$, and up to 65% $SiO_2$.

8. Process according to claim 1, further comprising a step of transferring the separated first slag to a second furnace suitable for performing a step of reducing smelting, thereby obtaining a second Ni and Co-bearing alloy, and a depleted second slag.

9. Process according to claim 8, wherein said second furnace is an electric furnace.

10. Process according to claim 3, further comprising a step of liquid/liquid separation of the second alloy from the second slag.

11. Process according to claim 10, further comprising a step of recirculating the separated second alloy to the step of autogenous smelting.

12. Process according to claim 1, further comprising the steps of:

atomizing the first alloy; and, dissolving the atomized alloy in acidic conditions, thereby obtaining a metal-bearing solution suitable for further hydrometallurgical refining.

* * * * *